US011143763B2

(12) United States Patent
Hofmann et al.

(10) Patent No.: US 11,143,763 B2
(45) Date of Patent: Oct. 12, 2021

(54) METHOD AND DEVICE FOR TRANSMITTING CORRECTION DATA AND FOR DETERMINING A HIGHLY ACCURATE POSITION OF A MOBILE UNIT

(71) Applicant: Robert Bosch GmbH, Stuttgart (DE)

(72) Inventors: Frank Hofmann, Hildesheim (DE); Ralf Luebben, Kiel (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 16/621,914

(22) PCT Filed: Apr. 24, 2018

(86) PCT No.: PCT/EP2018/060475
§ 371 (c)(1),
(2) Date: Dec. 12, 2019

(87) PCT Pub. No.: WO2018/228745
PCT Pub. Date: Dec. 20, 2018

(65) Prior Publication Data
US 2020/0124737 A1    Apr. 23, 2020

(30) Foreign Application Priority Data

Jun. 16, 2017 (DE) .......................... 102017210138.5

(51) Int. Cl.
*G01S 19/07* (2010.01)
(52) U.S. Cl.
CPC .......... *G01S 19/072* (2019.08); *G01S 19/071* (2019.08)

(58) Field of Classification Search
CPC ...... G01S 19/072; G01S 19/071; G01S 19/07; G01S 19/41; G01S 19/20; G01S 19/08; G01S 5/009
(Continued)

(56) References Cited

U.S. PATENT DOCUMENTS 5,959,577 A    9/1999 Fan et al.
6,215,441 B1    4/2001 Moeglein et al.
(Continued)

FOREIGN PATENT DOCUMENTS

DE    102010003255 A1    9/2011

OTHER PUBLICATIONS

International Search Report dated Jul. 10, 2018 of the corresponding International Application PCT/EP2018/060475 filed Apr. 24, 2018.

*Primary Examiner* — Harry K Liu
(74) *Attorney, Agent, or Firm* — Norton Rose Fulbright US LLP; Gerard Messina

(57) ABSTRACT

A method for sending correction data and for determining a highly accurate position of a mobile unit includes receiving a reference region that includes the mobile unit, the reference region being determined as a function of a rough position of the mobile unit; determining the correction data as a function of the reference region, the correction data describing a deviation of the rough position from the highly accurate position of the mobile unit; ascertaining a deviation of the correction data from reference correction data, the reference correction data being assigned to the reference region; and sending the correction data to the mobile unit in order to determine the highly accurate position of the mobile unit as a function of the deviation.

8 Claims, 6 Drawing Sheets

(58) Field of Classification Search
USPC .................................................. 342/357.44
See application file for complete search history.

(56) References Cited

U.S. PATENT DOCUMENTS

| | | | |
|---|---|---|---|
| 2009/0322515 A1* | 12/2009 | Kirchner | G01S 19/40 340/539.13 |
| 2010/0079333 A1 | 4/2010 | Janky et al. | |
| 2013/0271324 A1* | 10/2013 | Sendonaris | G01S 5/0236 342/450 |
| 2014/0035782 A1* | 2/2014 | Fischer | G01S 19/252 342/357.43 |

* cited by examiner

METHOD AND DEVICE FOR TRANSMITTING CORRECTION DATA AND FOR DETERMINING A HIGHLY ACCURATE POSITION OF A MOBILE UNIT

CROSS-REFERENCE TO RELATED APPLICATIONS

The present application is the national stage of International Pat. App. No. PCT/EP2018/060475 filed Apr. 24, 2018, and claims priority under 35 U.S.C. § 119 to DE 10 2017 210 138.5, filed in the Federal Republic of Germany on Jun. 16, 2017, the content of each of which are incorporated herein by reference in their entireties.

FIELD OF THE INVENTION

The present invention relates to a method and to a device for sending correction data and for determining a highly accurate position of a mobile unit, having a step of receiving a reference region, a step of determining the correction data as a function of the reference region, a step of ascertaining a deviation of the correction data from reference correction data, and a step of sending the correction data to the mobile unit in order to determine the highly accurate position of the mobile unit as a function of the deviation.

SUMMARY

The method according to the present invention for sending correction data and for determining a highly accurate position of a mobile unit includes a step of receiving a reference region that includes the mobile unit, the reference region being determined as a function of the rough position of the mobile unit, and a step of determining the correction data as a function of the reference region, the correction data describing a deviation of the rough position from the highly accurate position of the mobile unit. The method further includes a step of ascertaining a deviation of the correction data from reference correction data, the reference correction data being assigned to the reference region, and a step of sending the correction data to the mobile unit in order to determine the highly accurate position of the mobile unit as a function of the deviation.

Correction data are to be understood as data values that are determined in such a way that they describe a deviation of the rough position from the highly accurate position of the mobile unit.

The highly accurate position and the rough position are also present as data values in such a way that these data values can be used by the mobile unit and/or by the first device and/or by the second device in order to carry out the method according to the present invention and/or in order to operate the mobile unit and/or in order to operate the first device and/or in order to operate the second device.

Here, a rough position is to be understood as a position of the mobile unit within a specified coordinate system, such as GPS coordinates, where the position is subject to a certain degree of imprecision. This can be for example a position indication in the form of a circle, where the position is assigned a midpoint and a radius. By transferring the circle into a (two-dimensional) map, a rough position is obtained of the mobile unit, in that the mobile unit is localized as being situated inside the circle, where, for the indication of the rough position, it is not important precisely where inside the circle the mobile unit is situated. For example, the imprecision—and therefore the radius of the circle—are on the order of magnitude of a few meters, this value being subject to strong fluctuation. Typically, the area of the circle is greater than the base surface of the mobile unit (regarded from above).

Here, a highly accurate position means a position within a specified coordinate system, the position also being subject to a certain degree of imprecision. However, the highly accurate position differs from the rough position in that the imprecision is more accurate according to specified localization criteria. A localization criterion is for example that the imprecision of the highly accurate position is smaller by a specified factor than the imprecision of the rough position. Another localization criterion is for example that the imprecision of the highly accurate position is smaller than a specified maximum value. For example, the imprecision of the highly precise position is on the order of magnitude of about 20 cm or less.

A mobile unit is to be understood as, for example, a vehicle or a smartphone. A vehicle is to be understood for example as a partly automated, highly automated, or fully automated vehicle, or a manned vehicle.

In an example embodiment, as a function of the reference region the correction data are sent to more than one mobile unit, all of which units are included in the reference region, in order to determine a highly accurate position in each case.

A reference region is to be understood for example as a subregion of a (larger) region that is for example divided into equally large subregions. This division can be carried out both arbitrarily, e.g., in the form of rectangles, etc., and also in a manner adapted to particular features of the region, such as rivers, roads, lakes, mountains, etc. In an example embodiment, the reference region, as subregion, is a road segment, all subregions forming road segments within a (larger) region or road traffic network.

The reference correction data describe for example a minimum correction, i.e., a minimum deviation of the rough position from the highly accurate position, for correction data to be regarded as necessary, for example on the basis of safety considerations. In an example embodiment, the reference correction data correspond for example to correction data already determined earlier, a change, or a minimum change, of the correction data being ascertained via the deviation of the correction data from the reference correction data.

Previously, correction data were transmitted regardless of whether the correction data had substantially changed. Through the method according to the present invention, the correction data are advantageously transmitted as a function of a deviation of the correction data from reference correction data. This results in a reduction of the volume of data to be transmitted, and thus results in lower costs.

Particularly preferably, the sending of the correction data takes place only if the deviation is greater than a reference deviation, in accordance with specified criteria.

This is to be understood for example as meaning that the correction data have to be sent so that the mobile unit determines a highly accurate position that satisfies the criteria named above with regard to maximum imprecision.

Here the advantage can be seen that the method both takes into account a reduction of the volume of data to be transmitted and also takes into account that the sending of the correction data according to the specified criteria is unavoidable.

Preferably, the correction data are determined by transmitting the reference region to an external server, the correction data, as a function of the reference region, being received by the external server.

Here an advantage is seen that the determining of the correction data is for example outsourced by an external service to an external server that is specialized in the determination of the correction data. In this way, on the one hand, time is saved, and it can be ensured that the most up-to-date and most reliable correction data are always available.

Preferably, the correction data are determined as a function of the reference region in such a way that sources of error that contribute to the deviation of the rough position from the highly accurate position of the mobile unit are taken into account and are compensated.

Here an advantage is seen that the highly accurate position is in fact determined in a highly accurate manner, thus ensuring safe operation of the mobile unit, such as automated driving in an automated vehicle.

Preferably, the rough position of the mobile unit is determined using a satellite location system, and the sources of error represent an imprecision of a time measurement of the satellite location system and/or an imprecision of satellite orbit data of the satellite location system and/or an imprecision in a signal run time between the satellite location system and the mobile unit and/or disturbances in the ionosphere and/or troposphere between the satellite location system and the mobile unit.

Here an advantage is seen that, using a satellite location system, such as GNSS (Global Navigation Satellite System), an absolute position in a uniform coordinate system that is valid worldwide, such as WGS84, which is used by GPS (Global Positioning System), can be defined and determined. The use of correction data in connection with GPS is also referred to as DGPS (differential GPS), and increases the accuracy of the absolute position, or results in a highly accurate position in the sense of the method according to the present invention.

In an example embodiment, the correction data of the mobile unit are used to determine the highly accurate position in such a way that the correction data include for example satellite orbit corrections of the satellite location system and/or ionosphere models.

Preferably, in addition an intended use of the highly accurate position is received, and the correction data are additionally determined as a function of the intended use of the highly accurate position.

This is to be understood for example as meaning that the reference correction data are defined or determined as a function of an intended use. An intended use of the highly accurate position is for example to be understood as automated driving in an automatic vehicle. If the mobile unit is realized as a smartphone, then an intended use can be understood for example as the highly precise location of the smartphone (for example if the smartphone is used as a navigation system or the like).

A first device, according to an example embodiment of the present invention, for sending correction data and for determining a highly accurate position of a mobile unit includes first means for receiving a reference region that includes the mobile unit, the reference region being determined as a function of the rough position of the mobile unit, and includes second means for determining the correction data as a function of the reference region, the correction data describing a deviation of the rough position from the highly accurate position of the mobile unit. The first device additionally includes third means for ascertaining a deviation of the correction data from reference correction data, the reference correction data being assigned to the reference region, and fourth means for sending the correction data to the mobile unit in order to determine the highly accurate position of the mobile unit as a function of the deviation.

Preferably, the first means and/or the second means and/or the third means and/or the fourth means are designed to carry out a method as described herein.

The second device according to the present invention for receiving correction data and for operating a mobile unit includes fifth means for acquiring a rough position of the mobile unit, sixth means for determining a reference region that includes the mobile unit as a function of the rough position, and seventh means for transmitting the reference region to an external server that carries out a method according to at least one of the method claims.

The second device additionally includes eighth means for receiving the correction data, ninth means for determining a highly accurate position based on the rough position and the correction data, and tenth means for operating the mobile unit as a function of the highly accurate position.

Preferably, the sixth means are designed to determine the reference region as a function of a driver assistance function that requires the highly accurate position.

Example embodiments of the present invention are shown in the drawings and are explained in more detail in the following descriptions.

DETAILED DESCRIPTION

Figure 1:
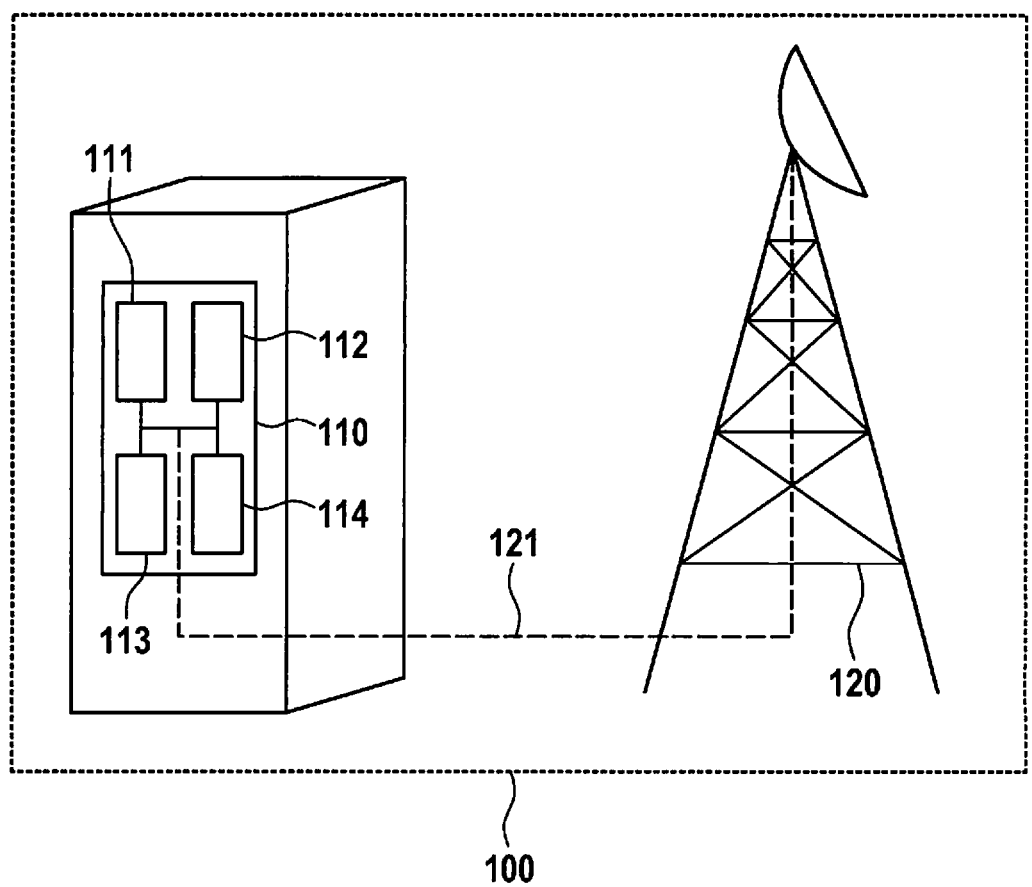
FIG. 1 shows a first device according to an example embodiment of the present invention.

FIG. 1 shows a computing unit 100 (shown as an example), which includes a first device 110 for sending 340 correction data and for determining a highly accurate position 201 of a mobile unit 200. A computing unit 100 is to be understood for example as a server. In a further example embodiment, a computing unit 100 is to be understood as a cloud, i.e., a composite of at least two electrical data processing systems that exchange data for example via the Internet. In another example embodiment, computing unit 100 corresponds to first device 110.

First device 110 includes first means 111 for receiving 310 a reference region 210 that includes mobile unit 200, the reference region being determined as a function of a rough position 202 of mobile unit 200, and second means 112 for determining 320 the correction data as a function of reference region 210, the correction data describing a deviation of the rough position 202 from the highly accurate position 201 of mobile unit 200. First device 110 further includes third means 113 for ascertaining 330 a deviation of the correction data from reference correction data, the reference correction data being assigned to reference region 210, and fourth means 114 for sending 340 the correction data to mobile unit 200 in order to determine the highly accurate position 201 of mobile unit 200 as a function of the deviation.

Depending on the respective example embodiment of computing unit 100, first means 111 and/or second means 112 and/or third means 113 and/or fourth means 114 can be differently realized. If computing unit 100 is realized as a server, then first means 111 and/or second means 112 and/or third means 113 and/or fourth means 114 are located at the same location, relative to the location of first device 110.

If computing unit 100 is realized as a cloud, then first means 111 and/or second means 112 and/or third means 113 and/or fourth means 114 can be situated at different locations, for example in different cities and/or different countries, a connection, such as the Internet, being realized for the exchange of (electronic) data between first means 111 and/or second means 112 and/or third means 113 and/or fourth means 114.

First means 111 are designed to receive a reference region 210. First means 111 include a receive and/or transmit unit by which data are requested and/or received. In another example embodiment, first means 111 are designed in such a way that they are connected to an externally situated (going out from first device 110) transmit and/or receive unit 122 via a cable connection and/or cable-free connection 121. In addition, first means 111 include electronic data processing elements, for example a processor, a working memory, and a hard drive, that are designed to process the received reference region, for example to carry out changes and/or an adaptation of the data format and subsequently to forward them to second means 112. In another example embodiment, first means 111 are designed to forward the received reference region—without data processing elements—to second means 112.

In addition, first means 111 are designed to additionally receive an intended use of highly accurate position 201 via the transmit and/or receive unit.

In addition, the first device includes second means 112 that are designed to receive correction data as a function of reference region 210, the correction data describing a deviation of rough position 202 from the highly accurate position 201 of mobile unit 200. If the correction data are determined in that reference region 210 is transmitted to an external server 250 and the correction data are received from external server 250 as a function of reference region 210, then the example embodiment of second means 112 corresponds for example to an example embodiment of first means 111.

In a further example embodiment of first device 110, first means 111 and second means 112 are identical, i.e., they are both designed to receive the reference region and the correction data in the form of data values.

In a further example embodiment of first device 110, second means 112 are designed to determine the correction data by reading correction data from a memory in which they were previously stored.

In addition, first device 110 has third means 113 for ascertaining 330 a deviation of the correction data from reference correction data, the reference correction data being assigned to reference region 210. For this purpose, third means 113 include electronic data processing elements, such as a processor, working memory, and a hard drive. In addition, third means 113 include a corresponding software unit that is designed to determine the deviation of the correction data from reference correction data.

In addition, first device 110 includes fourth means 114 for sending 340 the correction data to mobile unit 200 in order to determine the highly accurate position 201 of mobile unit 200, as a function of the deviation. For this purpose, fourth means 114 include a transmit and/or receive unit by which data are requested and/or received. In a further example embodiment, fourth means 114 is designed such that, going out from first device 110, it is connected to an externally situated transmit and/or receive unit 122 by a cable connection and/or cable-free connection 121. In a further example embodiment, the transmit and/or receive means is identical with the transmit and/or receive means of first means 111 and/or second means 112 (if, depending on the example embodiment, these are realized as a transmit and/or receive unit).

In addition, fourth means 114 include electronic data processing elements, for example a processor, a working memory, and a hard drive, which are designed to process the determined data, for example to carry out changes and/or adaptation of the data format, and subsequently to provide them as data values.

Figure 2:
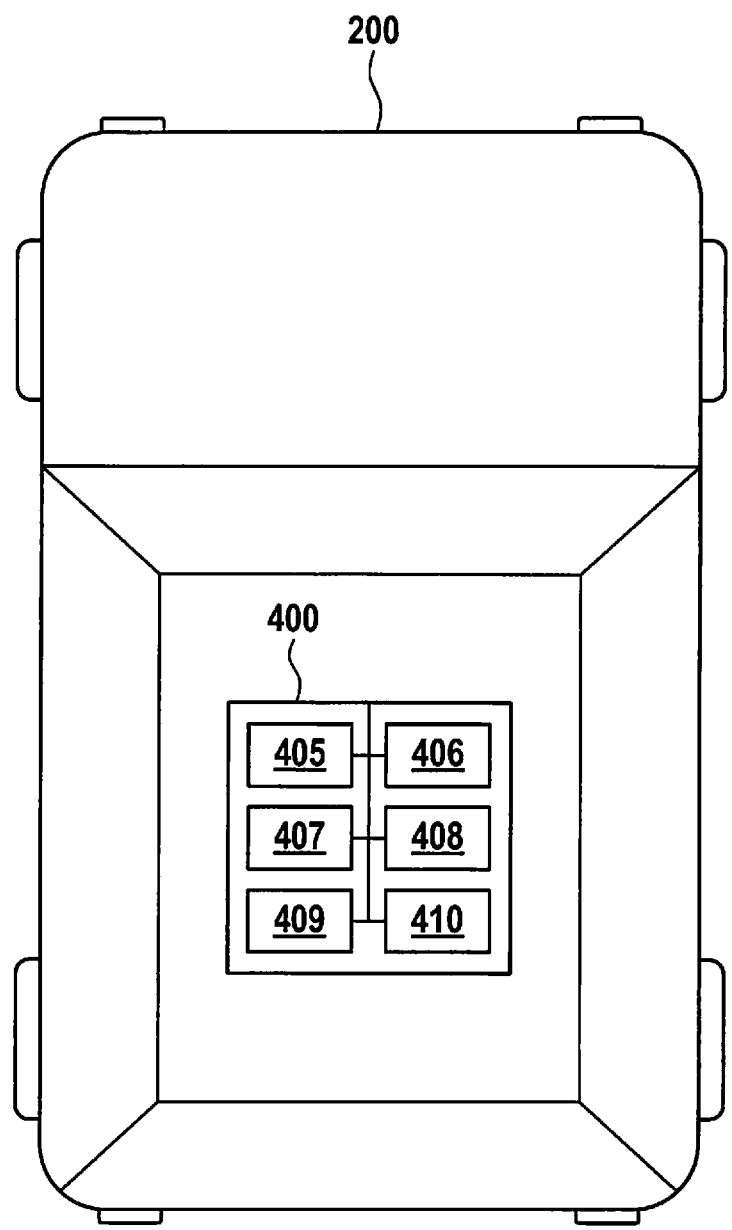
FIG. 2 shows a second device according to an example embodiment of the present invention.

FIG. 2 shows a mobile unit 200, here shown purely as an example as an (automated) vehicle, including a second device 400 for receiving correction data and for operating mobile unit 200. In a further example embodiment, mobile unit 200 is realized for example as a smartphone, second device 400 for example being realized as an electronic component.

Second device 400 includes fifth means 405 for acquiring a rough position 202 of mobile unit 200, sixth means 406 for determining a reference region 210 that includes mobile unit 200 as a function of rough position 202, and seventh means 407 for transmitting reference region 210 to an external server 100, which carries out a method 300 according to the described method for sending 340 correction data and for determining a highly accurate position 201 of a mobile unit 200. The second device in addition includes eighth means 408 for receiving the correction data, ninth means 409 for determining a highly accurate position 201 based on rough position 202 and the correction data, and tenth means 410 for operating mobile unit 200 as a function of highly accurate position 201.

Fifth means 405 are for example realized as a navigation system that acquires a rough position 202 of mobile unit 200, for example in the form of GPS coordinates.

Sixth means 406 are realized for example as a storage device that—as a function of a rough position 202—determines reference region 210 by assigning it to rough position 202. In an example embodiment, fifth means 405 and sixth means 406 are realized as a common means, such as a navigation system. In an example embodiment, sixth means 406 are realized as a computing unit (processor, working memory, hard drive) which determines reference region 210 as a function of rough position 202.

Seventh means 407 are realized as transmit and/or receive means. For this purpose, they include a receive and/or transmit unit by which signals are requested and/or received. In a further example embodiment, seventh means 407 is designed such that it is connected to an externally situated (going out from second device 400) transmit and/or receive unit via a cable connection and/or cable-free connection. This can for example be a navigation system included in mobile unit 200.

In a further example embodiment, seventh means 407 are realized such that they are connected to a mobile receive device, in particular a further smart phone. This connection can take place for example via a cable connection and/or a cable-free connection such as Bluetooth. In a further example embodiment, seventh means 407 include electronic data processing elements, for example a processor, a working memory, and a hard drive, which are designed to process the transmitted and/or received signal, and for example to carry out a change and/or adaptation of the data format.

Eighth means 408 for receiving the correction data are also realized as transmit and/or receive means. In an example embodiment, eighth means 408 correspond to an example embodiment of seventh means 407. In a further example embodiment, seventh means 407 and eighth means 408 are realized as common means.

Ninth means 409 for determining a highly accurate position 201, based on rough position 202 and the correction data, are realized for example as a control device or computing unit. Highly accurate position 201 is determined for example in that rough position 202 is present as a vector and the correction data contain indications, also in the form of a vector, that are combined by vector addition and as a result yield highly accurate position 201.

Tenth means 410 for operating mobile unit 200 as a function of highly accurate position 201 are realized for example as a control device and/or display unit. Here, for example highly accurate position 201 is displayed by the display unit. In addition, based on highly accurate position 201, an influence can be exerted on the driving behavior of mobile unit 200 (if this is realized as a vehicle), for example in the form of a change of direction and/or change of speed.

In an example embodiment, the correction data are requested and/or received as a function of the location technology that is used, which, for example in the form of fifth means 405, determines a rough position 202, and/or in the form of ninth means 409 determines a highly accurate position. Possible location technologies are for example differential GNSS, PPP-GNSS, RTK-GNSS, etc. The various location technologies, and the location services associated therewith, can for example also differ in the accuracy of the correction data, and can be divided into different groups as a function of the degree of accuracy required in each case.

In an example embodiment, when the correction data are requested and/or when the reference region 210 is sent to the first device 110, mobile unit 200 is assigned to such a group on the basis of the location technology (or the location service associated therewith) that is used, and receives the correction data as a function of this assignment and as a function of reference region 210.

Figure 3A:
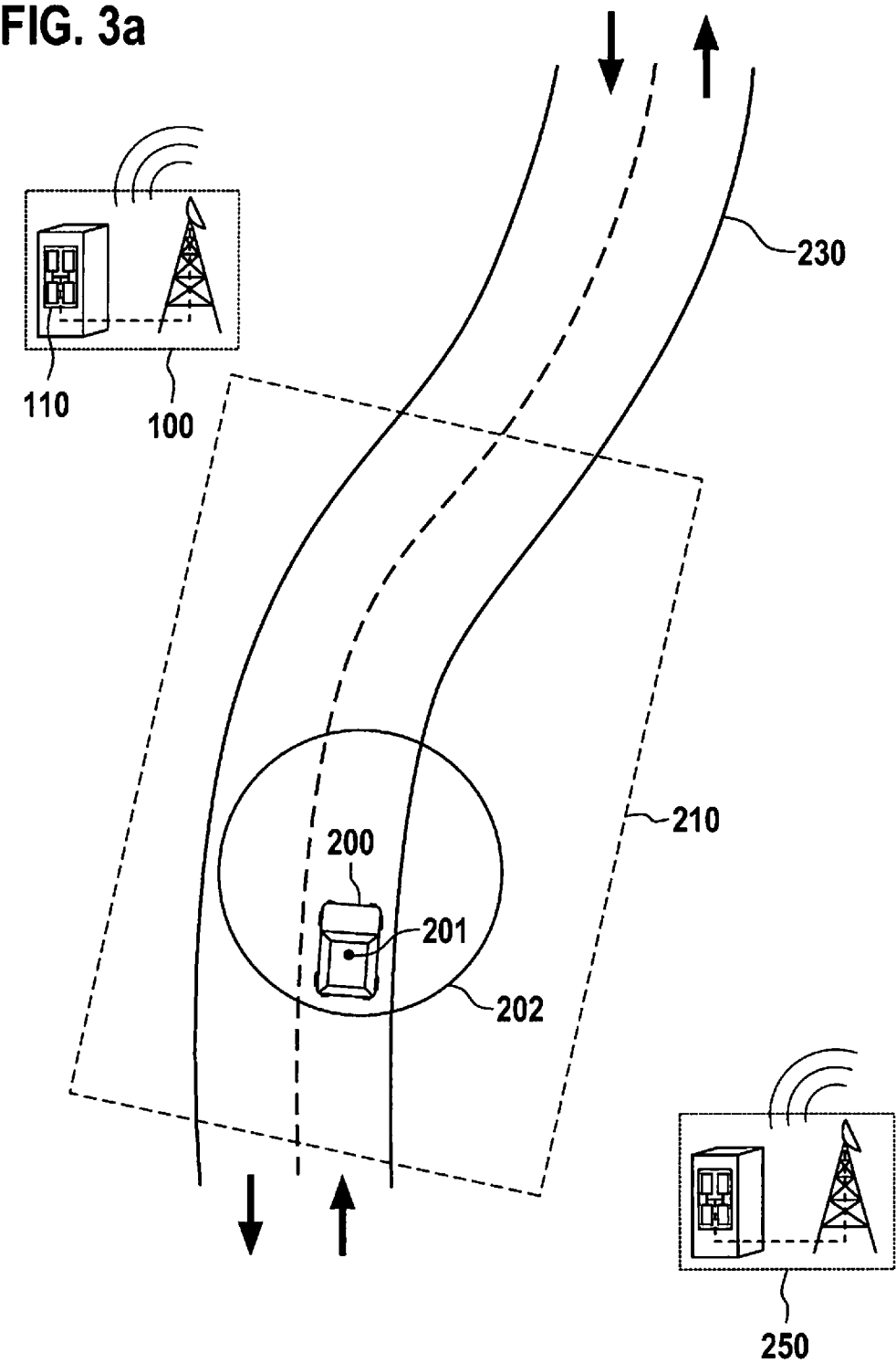
FIGS. 3a and 3b show a representation corresponding to a method according to an example embodiment of the present invention.

FIG. 3a shows an example embodiment of method 300 according to the present invention for transmitting 340 correction data and for determining a highly accurate position 201 of a mobile unit 200. Mobile unit 200, here shown as a vehicle as an example, is here shown moving on a traffic route 230. Mobile unit 200 acquires a rough position 202, here shown as a circle as an example, the imprecision of rough position 202 being at least such that for example an automated operation of mobile unit 200, for example along traffic route 230, is excluded.

On the basis of rough position 202, a reference region 210 is determined that includes mobile unit 200. This takes place for example in that mobile unit 200 includes a map that assigns a reference region 210 to each position, or rough position, 202. In a further example embodiment, reference region 210 is defined and determined dynamically, i.e., as a function of specified parameters, by calling reference region 202 from, for example, an external server. The specified parameters include for example the current clock time, the current weather conditions, etc.

After reference region 210 has been determined, it is transmitted to first device 110 and is received by the first device via first means 111. Subsequently, correction data are determined as a function of reference region 210, the correction data describing a deviation of rough position 202 from highly accurate position 201 of mobile unit 200. Subsequently, a deviation of the correction data from reference correction data is ascertained, the reference correction data being assigned to reference region 210. In an example embodiment, the reference correction data correspond for example to the correction data that were previously sent to mobile unit 200. This is determined for example in that the received reference region 210 includes a digital signature that is characteristic for the mobile unit, whereby the current reference region 210, or the currently determined correction data, are compared with past received reference regions or past determined correction data. Subsequently, the correction data are sent to mobile unit 200 in order to determine the highly accurate position 201 of mobile unit 200, as a function of the deviation, and are received by mobile unit 200.

Based on the rough position 202 and the received correction data, highly accurate position 201 is now determined using ninth means 409 of second device 400, which is included in mobile unit 200, and mobile unit 200 is operated as a function of highly accurate position 201.

Figure 3B:
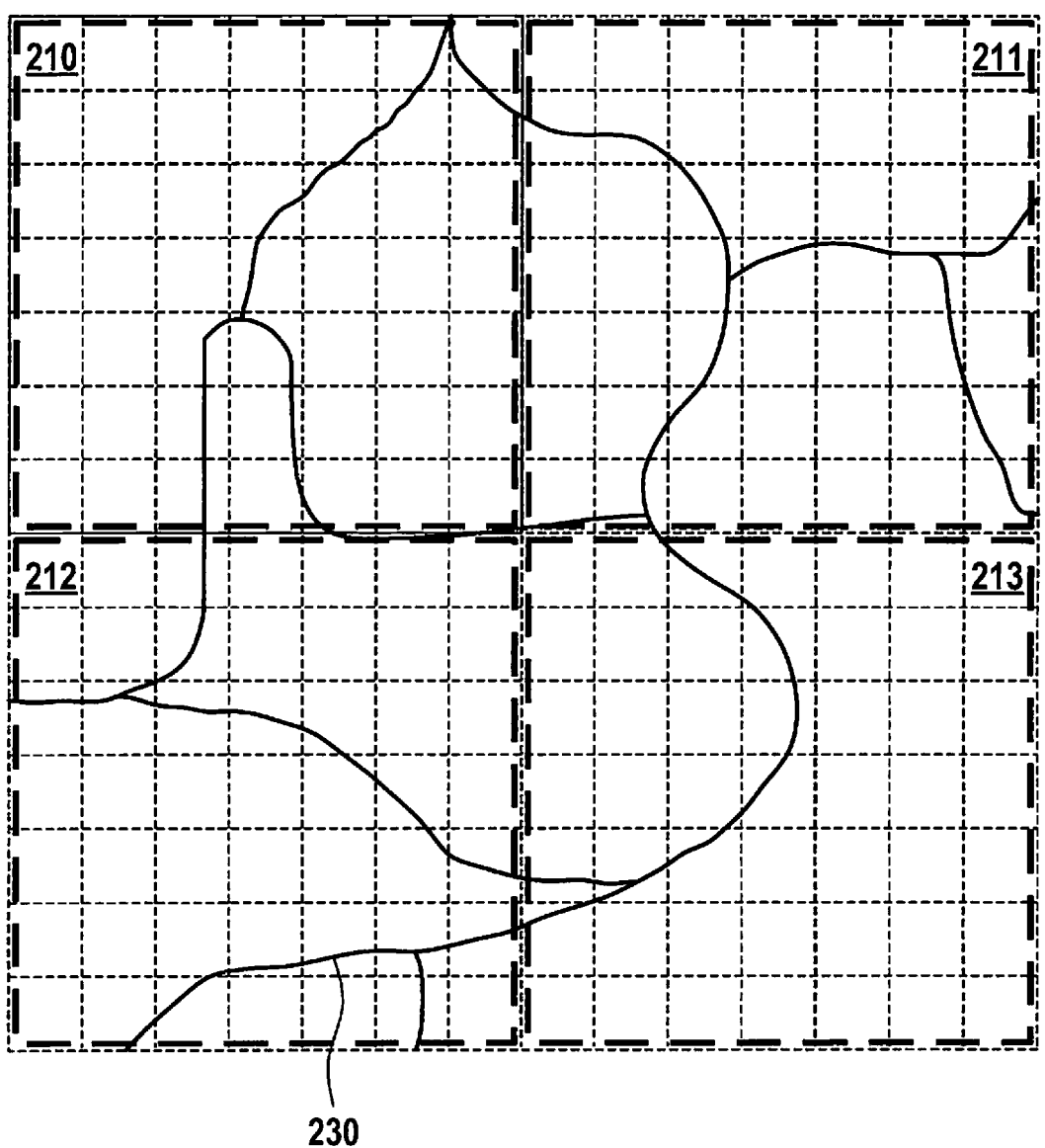

FIG. 3b shows, purely as an example, a schematic division of a region into a plurality of reference regions 210, 211, 212, 213, here including a traffic route 230. Correction data are assigned to each of the plurality of reference regions 210, 211, 212, 213, which data make it possible for a mobile unit 200 within one of the plurality of reference regions 210, 211, 212, 213 to determine a highly accurate position 201 on the basis of a previously known rough position 202, using the correction data.

Here, the correction data are transmitted to mobile unit 200 by first device 110 only when a deviation of the correction data from reference correction data (the reference correction data also being assigned to each of the plurality of reference regions 210, 211, 212, 213) is greater than a reference deviation, according to predefined criteria.

In an example embodiment, the deviation is smaller than a reference deviation, for example according to the defined criteria, so that no transmission takes place, as long as mobile unit 200 is situated inside a reference region 210, and the deviation becomes larger than a reference deviation, according to the defined criteria, when mobile unit 200 moves from one of the plurality of reference regions 210, 211, 212, 213 into another of the plurality of reference regions 210, 211, 212, 213.

Figure 4A:
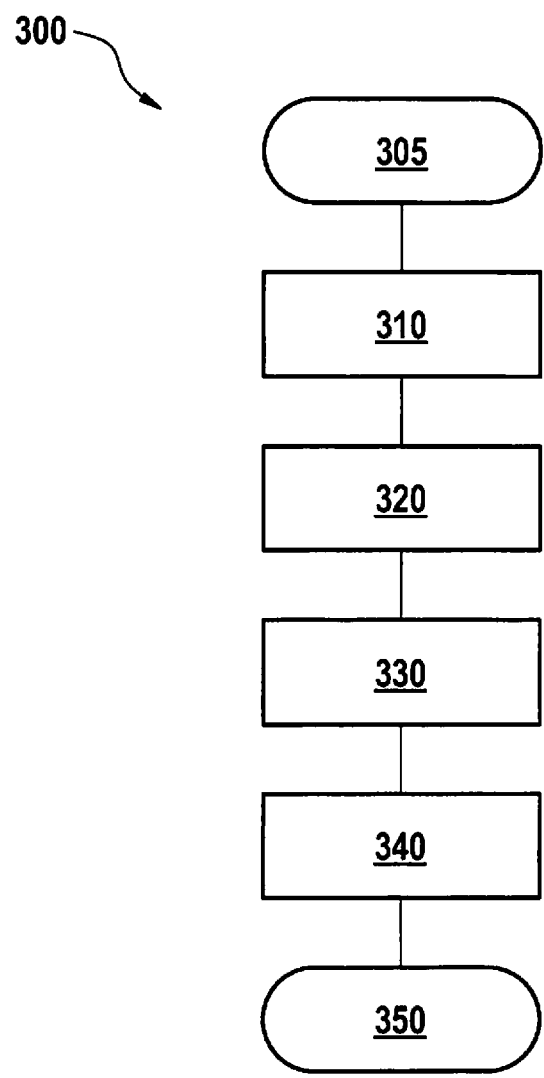
FIGS. 4a and 4b are flowcharts that illustrate a method according to an example embodiment of the present invention.

FIG. 4a shows an example embodiment of method 300 according to the present invention for sending 340 correction data and for determining a highly accurate position 201 of a mobile unit 200.

In step 305, method 300 starts, the method being carried out by first device 110, using first means 111 and/or second means 112 and/or third means 113 and/or fourth means 114.

In step 310, a reference region 210 that includes mobile unit 200 is received, the reference region being determined as a function of a rough position 202 of mobile unit 200.

In step 320, correction data, as a function of reference region 210, are received, the correction data describing a deviation of rough position 202 from highly accurate position 201 of mobile unit 200.

In step 330, a deviation of the correction data from reference correction data is ascertained, the reference correction data being assigned to reference region 210.

In step 340, the correction data are sent to mobile unit 200 in order to determine the highly accurate position 201 of mobile unit 200 as a function of the deviation.

In step 350, method 300 ends.

Figure 4B:
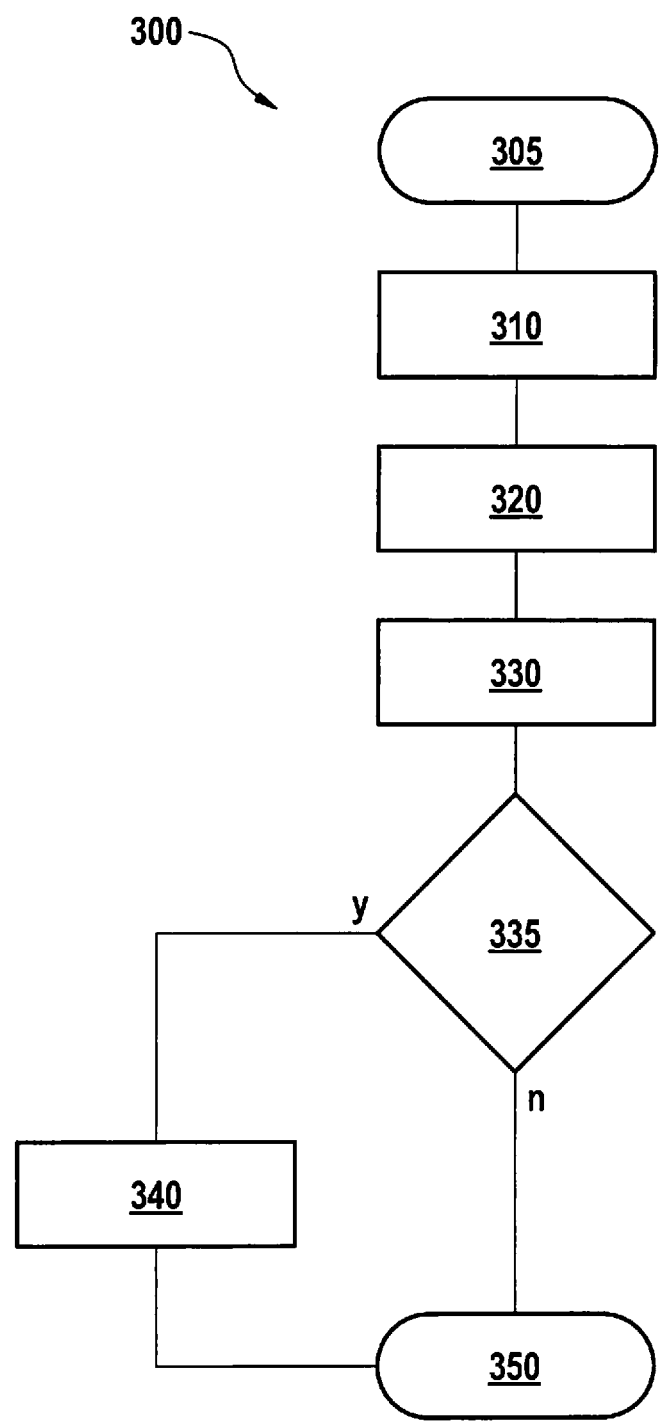

FIG. 4b shows an example embodiment of method 300 according to the present invention for sending 340 correction data, and for determining a highly accurate position 201 of a mobile unit 200.

In step 305, method 300 starts.

In step 310, a reference region 210 that includes mobile unit 200 is received, the reference region being determined as a function of a rough position 202 of mobile unit 200.

In step 320, correction data, as a function of reference region 210, are received, the correction data describing a deviation of rough position 202 from highly accurate position 201 of mobile unit 200.

In step 330, a deviation of the correction data from reference correction data is ascertained, the reference correction data being assigned to reference region 210.

In step 335, it is checked whether the deviation, according to defined criteria, is greater than a reference deviation. If yes, step 340 follows. If no, step 350 follows.

In step 340, the correction data are sent to mobile unit 200 in order to determine highly accurate position 201 of mobile unit 200 as a function of the deviation.

In step 350, method 300 ends.

What is claimed is:

1. A method, comprising:
    receiving a reference region, in which a mobile unit is located and which is determined as a function of a rough position of the mobile unit;
    determining, based on the reference region, correction data describing a deviation of the rough position of the mobile unit from a highly accurate position of the mobile unit;
    ascertaining a deviation of the correction data from reference correction data that is assigned to the reference region; and
    sending based on the ascertained deviation of the correction data from reference correction data, the correction data to the mobile unit to determine the highly accurate position of the mobile unit;
    wherein the determination of the correction data based on the reference region includes compensating for sources of error, and
    wherein the rough position of the mobile unit is determined by a satellite location system, and wherein the sources of error represent at least one of:
        an imprecision of a time measurement of the satellite location system;
        an imprecision of satellite orbital data of the satellite location system;
        an imprecision in a signal run time between the satellite location system and the mobile unit; and/or
        disturbances in an ionosphere and/or troposphere between the satellite location system and the mobile unit.

2. The method of claim 1, wherein the sending of the correction data takes place in response to the ascertained deviation of the correction data from reference correction data being greater than a reference deviation, according to defined criteria.

3. The method of claim 1, wherein the reference region is transmitted to an external server, and wherein the external server obtains the correction data based on the reference region.

4. The method of claim 1, wherein the sources of error contribute to the deviation of the rough position from the highly accurate position.

5. The method of claim 1, wherein the determination of the correction data is based on a received intended use of the highly accurate position.

6. A device, comprising:
    a receiver;
    a processor; and
    a transmitter;
    wherein the processor is configured to perform the following:
        determining, based on a reference region, in which a mobile unit is located, that is determined as a function of a rough position of the mobile unit, and that is received via the receiver, correction data describing a deviation of the rough position of the mobile unit from a highly accurate position of the mobile unit;
        ascertaining a deviation of the correction data from reference correction data that is assigned to the reference region; and
        sending, based on the ascertained deviation of the correction data from reference correction data, the correction data via the transmitter to the mobile unit in order to determine the highly accurate position of the mobile unit;
    wherein the determination of the correction data based on the reference region includes compensating for sources of error, and
    wherein the rough position of the mobile unit is determined by a satellite location system, and wherein the sources of error represent at least one of:
        an imprecision of a time measurement of the satellite location system;
        an imprecision of satellite orbital data of the satellite location system;
        an imprecision in a signal run time between the satellite location system and the mobile unit; and/or
        disturbances in an ionosphere and/or troposphere between the satellite location system and the mobile unit.

7. A device of a mobile unit comprising:
    a positioning system;
    a transmitter;
    a receiver; and
    a processor;
    wherein the positioning system is configured to acquire a rough position of the mobile unit, and
    wherein the processor is configured to perform the following:
        determining a reference region in which the mobile unit is located based on the acquired rough position;
        transmitting the reference region via the transmitter to an external server that is configured to:
        determining, based on the reference region, correction data describing a deviation of the rough position of the mobile unit from a highly accurate position of the mobile unit;
        ascertaining a deviation of the correction data from reference correction data that is assigned to the reference region; and
        sending, based on the ascertained deviation of the correction data from reference correction data, the correction data to the mobile unit;
        determining the highly accurate position of the mobile unit based on the rough position and the correction data received via the receiver from the external server; and
        operating the mobile unit based on the determined highly accurate position;
    wherein the determination of the correction data based on the reference region includes compensating for sources of error, and wherein the rough position of the mobile unit is determined by a satellite location system, and wherein the sources of error represent at least one of:
- an imprecision of a time measurement of the satellite location system;
- an imprecision of satellite orbital data of the satellite location system;
- an imprecision in a signal run time between the satellite location system and the mobile unit; and/or
- disturbances in an ionosphere and/or troposphere between the satellite location system and the mobile unit.

8. The second device of claim 7, wherein the determination of the reference region depends on a driver assistance function that requires the highly accurate position.

* * * * *